(12) United States Patent
Long et al.

(10) Patent No.: US 7,274,428 B2
(45) Date of Patent: *Sep. 25, 2007

(54) SYSTEM AND METHOD FOR PROCESSING IMAGES TO EMULATE FILM TONESCALE AND COLOR

(75) Inventors: David Long, Rochester, NY (US); Nestor M. Rodriguez, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 258 days.

This patent is subject to a terminal disclaimer.

(21) Appl. No.: 11/088,605

(22) Filed: Mar. 24, 2005

(65) Prior Publication Data

US 2006/0215115 A1    Sep. 28, 2006

(51) Int. Cl.
 G03B 19/18  (2006.01)
 H04N 9/47  (2006.01)
(52) U.S. Cl. .......................................... 352/38; 348/96
(58) Field of Classification Search ................ 352/38, 352/44, 130; 355/27; 386/46; 430/21, 359; 348/96, 577; 358/518
See application file for complete search history.

(56) References Cited

U.S. PATENT DOCUMENTS

| | | | |
|---|---|---|---|
| 5,140,414 A | 8/1992 | Mowry | 358/81 |
| 5,189,511 A | 2/1993 | Parulski et al. | 358/80 |
| 5,319,465 A | 6/1994 | Squyres et al. | 358/310 |
| 5,335,013 A | 8/1994 | Faber | 348/104 |
| 5,374,954 A | 12/1994 | Mowry | 348/121 |
| 5,406,326 A | 4/1995 | Mowry | 348/104 |
| 5,457,491 A | 10/1995 | Mowry | 348/104 |
| 5,475,425 A | 12/1995 | Przyborski et al. | 348/239 |
| 5,641,596 A | 6/1997 | Gray et al. | 430/21 |
| 5,668,596 A | 9/1997 | Vogel | 348/222 |
| 5,687,011 A | 11/1997 | Mowry | 358/527 |
| 5,831,673 A | 11/1998 | Przyborski et al. | 348/239 |
| 5,840,470 A | 11/1998 | Bohn et al. | 430/359 |
| 6,269,217 B1 | 7/2001 | Rodriguez | 386/46 |
| 6,711,323 B1 | 3/2004 | Nayyer | 385/22 |
| 7,034,862 B1 * | 4/2006 | Cirulli et al. | 348/96 |
| 2001/0053247 A1 * | 12/2001 | Sowinski et al. | 382/162 |
| 2004/0169898 A1 * | 9/2004 | Szajewski et al. | 358/487 |

OTHER PUBLICATIONS

"Interface of Motion-Pciture Films and Video" by Powell, Sehlin, Zavada, and Bogdanowicz. *SMPTE Journal*, Jun. 1986.

(Continued)

*Primary Examiner*—Rodney Fuller
(74) *Attorney, Agent, or Firm*—Peyton C. Watkins; Stephen N. Shaw

(57) ABSTRACT

A method for converting a sequence of scan-only film captured images into a sequence of modified images that provide the appearance of images captured by a photographic film reproduction system; the photographic film reproduction system being includes photographic motion picture negative film printed onto a motion picture print film that is displayed, or a reversal motion picture system in which the reversal film is displayed, or a photographic motion picture film electro-optically scanned to standard format video by a telecine and further displayed, or a photographic motion picture film electro-optically scanned by a scanner suitable for producing digital data intended for additional digital image manipulation and further preparation as a digital master for electronic distribution such as digital theatrical projection or various types of broadcast video; or recorded out to another photographic film to be used as a printing master for producing distribution optical prints for theatrical projection.

57 Claims, 3 Drawing Sheets

OTHER PUBLICATIONS

"Color Bars on Film for Setting Up Telecines" by Hunt. *SMPTE Journal*, Feb. 1978.

"Digital Film Scanning and Recording: The Technology and Practice" by G. Kennel. *SMPTE Journal*, Mar. 1994, pp. 174-181.

"A Simplified Motion-Picture Laboratory Control Method for Imrpoved Color Duplication" by Pytlak and Fleischer. *SMPTE Journal*, vol. 85, Oct. 1976.

* cited by examiner

SYSTEM AND METHOD FOR PROCESSING IMAGES TO EMULATE FILM TONESCALE AND COLOR

FIELD OF THE INVENTION

The present invention relates generally to the field of digital image processing in post-production to emulate conventional motion picture origination film images that satisfy the image quality criteria for tone scale, color, sharpness and texture (i.e. graininess) when optically transferred to print film (for theatrical projection), or electro-optically scanned to produce a video/data record suitable for visual display. More specifically, the invention relates to rendering a non-conventional motion picture "scan-only" film captured image lacking the required contrast and colorimetry to one that satisfies the specific optical imaging attributes (appearance) associated with a particular "conventional" origination film.

BACKGROUND OF THE INVENTION

Traditionally, high quality motion picture images are captured by a photographic film. The primary benefits of film over other image capture technologies for motion picture applications include wide exposure dynamic range, preferred color reproduction control, a desired level of texture (image grain), fast photographic speed, high resolution and sharpness, and flexibility in framing through various post-production operations. In general, motion picture images are used for exhibition in either theatrical projection or broadcast television distribution.

Color images on photographic film are produced by exposing light-sensitive layers coated on a flexible semitransparent support through a film camera and lens, and subjecting the film to prescribed chemical amplification processes to produce dyes with a predictable optical density profile. In typical motion picture applications, the original captured film image can be further printed optically onto another piece of intermediate or print motion picture film as suitable for theatrical projection or the optical density signature recorded on the film can be transferred to digital data on a film scanner. Once scanned, image manipulation can be imparted by way of a color corrector or various other digital intermediate techniques suitable for preparing the image for distribution (television broadcast, theatrical projection, etc.).

Photographic color negative films create complementary cyan, magenta, and yellow dye amounts from red green, and blue exposure, respectively. Dye amount is directly proportional to incident light intensity. The negative image is inverted by optically printing onto another negative-acting motion picture film or by processing downstream of a scanner in order to render it suitable for positive display. Photographic color positive films create complementary cyan, magenta, and yellow dye amounts from red, green, and blue exposure also, but the dye amount is inversely proportional to incident intensity. This allows for the positive image to be directly projected in theatrical distribution or to be scanned without a required polarity inversion.

For theatrical exhibition of images captured by film but digitized for the purpose of creative enhancement or the addition of visual effects, calibrated electro-optical scanners are used to convert film density to digital data suitable for electronic display (monitor or digital cinema, for example) or to digital data suitable for driving a film recorder to produce a reproduction of the original image on another piece of film. In the case of the film recorder example, the new film image produced can be used to generate distribution prints for exhibition in typical motion picture cinema theaters.

For broadcast television exhibition, electro-optical scanners known as telecines are used to convert film density to voltage signals suitable for driving a typical display/broadcast monitor.

When images captured with conventional motion picture origination film are chemically developed, and then optically transferred to print film or electro-optically scanned for electronic processing/display, they produce an image appearance that is primarily inherent of the "origination" film's tone, color, sharpness and texture (i.e. graininess). These "origination film attributes" all contribute to what cinematographers describe as the "film look." A number of origination films are manufactured for the purpose of producing several "film looks" to satisfy the various creative needs of cinematographers. The unique look of each of these films is primarily determined by the type of light sensitive (spectral) and image processing chemistry incorporated into the film's color recording emulsions. If an alternate "image processing" means (method) were available to reproduce the many origination film looks without having the need for incorporating separate chemistry formulations in each film type, it would be advantageous (e.g. cost/workflow efficiency) to theatrical and television film productions. For instance, producers would no longer have a need to carry/track inventory for the several origination film types to satisfy the production needs (looks) of the cinematographer.

Also by removing the requirement for an origination film stock to possess "film-look-ready" images for either optical printing steps or electro-optical scanning steps, the origination film chemistry could now be altered and aimed more efficiently at capturing a higher degree of scene information, as well as producing the corresponding developed image with optical attributes that would allow for greater information to be extracted (being better matched to a scanner's electro-optical characteristics). The film would need to be scanned (a type of "scan-only" film) so that the "image processing" chemistry that was removed (to give an origination film its unique look) could now be applied during a post image processing stage (via software and/or hardware) to achieve the various origination "film stock" looks. The image processing would implement algorithms (in the form of mathematical matrices, 3D look-up tables, or equations) with parameters/values assigned to reproduce the unique film look associated with the particular image processing chemistry formulation that exists in a conventional origination film type. This type of film would allow implementing the same type of image processing algorithms and functional workflow as described in the electronic capture/processing system of U.S. Pat. No. 6,269,217 B1 (after having undergone chemical development and optical scanning). This reference describes not only color, tone, sharpness and texture (graininess) processing, but also the processing needed to compensate for geometric (framing) and psychophysical viewing phenomena associated with image viewing conditions as well as the processing required to prepare images for specific display devices. Relative to current electronically captured images, origination film emulsion technology (e.g. Kodak ECN films) used in motion picture films can reproduce color image data with wider scene exposure latitude (especially in scene highlights and over-exposures) and red/green/blue spatial resolution, in addition to being able to provide a longer archival image record (optical) than the current magnetic (e.g. tape) or electro-optic (e.g. optical disk) media used to record/store the image signals from electronic motion cameras.

Several valid examples of related prior art have been investigated to determine their relevancy to the present invention. Digital image processing may take place on video images, as described in U.S. Pat. Nos. 5,335,013; 5,475,425 and 5,831,673, in order to emulate the broadcast look of film or the look of film after it has been through a telecine transfer. These patents describe systems for rendering the output of a video camera to simulate the visual appearance of motion picture film that has been transferred or converted to a video signal to be output directly for television broadcasting or recording on video tape. Further, the above-cited prior art teaches three components for the emulation of the look of broadcast motion picture film. One component deals with the conversion of the video or digital material into various video formats from either 30 frames per second (fps) or 24 fps origination rate. The second component allows for the selective addition of filtered random-type noise to the electronically captured images to give the appearance of motion picture film grain. The third component allows for the alteration of the apparent contrast of the video image so the desired broadcast film appearance may be obtained. More specifically, in the '013 patent a gray scale modifier is used as a look-up table (LUT) and the operator can choose between a variety of curves (% light level vs. video level) stored in programmable read-only memory (PROM) to reflect different film types or achieve different photographic effects. The desired curve is selected by pressing a switch on the hardware. None of these patents refers to a system for manipulating images to match the color/tone characteristics of photographic motion picture films where the starting image is derived from an electro-optical scan of a scan-only film. Further, none reference the electronic processing of scanned images where the primary image space is data and not video.

U.S. Pat. Nos. 5,140,414; 5,374,954; and 5,406,326 (each issued to Mowry) represent a family of related post-production video technology that seeks to arrive at an aesthetically acceptable simulation of the appearance that images originated on different motion picture film stocks would embody after telecine "flying spot scanner" transfer to video from taped high definition video originated images. U.S. Pat. Nos. 5,457,491 and 5,687,011 further extend the concept to providing emulations of images captured on one medium from the capture of the image on a second medium, presumably to include any film capture medium. One component of this prior art technology deals with the conversion of the video-originated material through a LUT that is based on color temperature of the scene lighting, scene brightness and selected f-stop setting. The conversion values in the LUT are derived by filming color charts and gray-scale charts, obtaining a digital representation of the film component responses of the charts from telecine transfer of the film to videotape, and then charting the telecine-derived component responses against video originated images of the same charts under identical lighting conditions. Another component of this prior art technology allows for optically superimposing selected film grain patterns to the video images. The final simulated video image is either recorded as a high definition signal, or converted to an NTSC signal and broadcast or displayed.

In the latter two of the aforementioned Mowry patents, the digitized video signal may be sent to a film recorder, which reproduces the component-modified images onto a selected, reversal film stock. The film is chemically processed with a film processor and then optically projected, or scanned to video, digital video, or other electronic media. However, if the film recording option is employed, these patents specify that it is important that the telecine-derived LUT used in the component modification involves response data which compensates for the inherent color response of the film stock on which the images are being digitally recorded.

In all of the Mowry patents, the creation of image processing LUTs capable of transforming image data representative of the characteristics of one medium to characteristics representative of a second medium, those characteristics including color and tone among others, requires that reference images be necessarily captured on both media to provide statistical basis for the relationship algorithm.

U.S. Pat. Nos. 6,771,323, and 5,840,470 teach how fundamental image characteristic data can be used to provide device-independent or device-dependent intermediate data appropriate for simulating the image characteristics of multiple capture or display media and devices, including film, computer monitors, or video signals from a given image capture device or media. It focuses on capturing imaging device properties such as white level, black level, color level, linearity, and frequency response, and adding those image characteristics to primary scene content to yield enhanced content. It does not, however, reference the full gamut of motion picture color film imaging characteristics necessary to provide completely independent intermediate data, specifically those relevant to the properties of color reproduction. Further it does not acknowledge how some intermediate image spaces, such as scene exposure or scene luminance, must still be qualified by the spectral response properties of imaging devices and converted appropriately to provide full emulation of alternate imaging devices.

Another prior art example of post-production digital image processing, where the digital image could originate from an electronic camera or an electro-optical scan of a film frame, exists in certain current image manipulation software packages. FIG. 1 shows a schematic diagram of one such example of this type of prior art processing, namely, histogram equalization. The histogram equalization method requires, for every frame 1 of a digital image that is to be manipulated, a scanned frame 2 of a reference film preferably with, for optimal results, the same scene content. Some resizing constraints 3 might also have to be met, depending on the software, because the digital image and the scanned film image will most likely not be the same size. Then, with these two input images, a well-known cumulative histogram equalization process 4 is performed to manipulate the digital images closer to a film tonescale and color, thereby providing output manipulated images 5. This method, however, is not optimal for digital images because its inputs can be of mixed formats, especially in the case electronically captured images: some form of RGB exposures from the electronically captured images versus the scanned film densities. As a result, it is impossible to optimally alter the tonescale and color of the electronically captured image to emulate scene exposure as seen by film. For digital images created from electro-optical scans of film frames, the technique also presents problems as only scene color and tone content represented in the references frames can be properly compared. This necessarily excludes specific scene tone and color gamut information not represented in the reference frames. A final limitation of the method is that a reference frame is always required to produce the desired result, leading to impractical image capture scenarios in most common applications.

In a combined approach, U.S. Pat. No. 5,319,465 describes a method using modified camera production and modified post-production processes and equipment to create filmic images. Specifically, the method includes the steps of shooting a benchmark comprising a gray scale chart, a color test chart and two backfocus charts with both a film and a video camera with comparable scene lighting and depth of field. Once the film test benchmark is shot, the film is transferred to videotape utilizing a telecine apparatus, with settings indicative of an industry standard set-up film. The video camera image's hue, saturation, luminance and gamma levels are manipulated to color correct the video camera image to look visually like the transferred film image. After the videotape has been edited, the videotape undergoes color correction in which the videotape benchmark is corrected to match the film test benchmark.

The prior art is generally trying to emulate the look of film after it has been telecine-transferred to video. This is desirable to some extent because the telecine system does have some film attributes when broadcasted. However, the prior art neglects the emulation of the look of film origination, as if a negative film has been directly printed and projected through a motion picture system. This is particularly desirable where the digital output is recorded on film for projection. Where the prior art does deal with film recording, as in the latter two of the above-mentioned Mowry patents, it does so in the context of a telecine-transferred benchmark. Moreover, when the prior art alters the tone scale and color of a video or digitally captured image to emulate a film, it is done on the telecine-transferred benchmark. This is an imperfect alteration because it cannot operate upon the scene exposure as seen by a film.

What is needed is a system that correctly emulates the look of photographic film origination, when the origination film is now a "scan-only" type of film that lacks the image processing chemistry to provide the image look associated with a specified photographic origination film stock, particularly as to the emulation of film tonescale and color reproduction, as if a photographic origination film has been directly printed and projected through a motion picture system.

SUMMARY OF THE INVENTION

The present invention is directed to overcoming one or more of the problems set forth above. Briefly summarized, according to one aspect of the present invention, a sequence of "scan-only" origination film captured images are converted into modified images that provide the appearance of images captured by a photographic film reproduction system, where the photographic film reproduction system is of the type that includes a photographic motion picture negative film printed onto a motion picture print film that is displayed, or a reversal motion picture system in which the reversal film is displayed, or a photographic motion picture film electro-optically scanned to standard format video by a telecine and further displayed, or a photographic motion picture film electro-optically scanned by a scanner suitable for producing digital data intended for additional digital image manipulation, further prepared as a digital master for electronic distribution such as digital theatrical projection or various types of broadcast video, or recorded out to another film to be used as a printing master for producing distribution optical prints for theatrical projection. After capturing the images on a "scan-only" origination film that lacks the image processing chemistry for proper tone and color reproduction, the photographic film images are electro-optically scanned/digitized, and the image data is transformed into linearized exposure data by way of a combination of linear functions and/or matrices and one-dimensional LUTs, thereafter the image is subsequently transformed with a linear function that emulates a film exposure of the photographic film reproduction system. The exposure-corrected images are then transformed with a non-linear function that renders the exposure-corrected images with a tone scale of the photographic film reproduction system, and the tonescale-corrected images are transformed with a linear matrix or 3D/LUT function that emulates a film color look provided by the photographic film reproduction system. In order to achieve the desired results, the transformation steps are referenced to scan film densities of the photographic film used in the photographic film reproduction system.

These and other aspects, objects, features and advantages of the present invention will be more clearly understood and appreciated from a review of the following detailed description of the preferred embodiments and appended claims, and by reference to the accompanying drawings.

ADVANTAGES OF THE INVENTION

The present invention alters the tonescale and color of a "scan-only" origination film captured image only after it has been shifted to emulate scene exposure as seen by a photographic origination film. Then the shifted electronic exposures are mapped through predetermined 1D LUTs and matrices that impart a photographic film tonescale and color to the "scan-only" film captured image. This method is advantageous because it allows for automation of the image processing with predetermined algorithms. In addition, it does not require color-timing decisions to be made by an operator on a per scene basis, if the "scan-only" film set-ups remain constant.

The present invention method is also advantageous because it allows for automation of the image processing and does not require use of a reference frame of the photographic film on a per frame basis for matching the tone and color of a photographic film image. A photographic film reference is only required for each different "scan-only" film set-up on the film scanner or telecine. Once the algorithms of the present invention are created, the image rendering runs independent of any photographic film frame references.

DETAILED DESCRIPTION OF THE INVENTION

Figure 1:
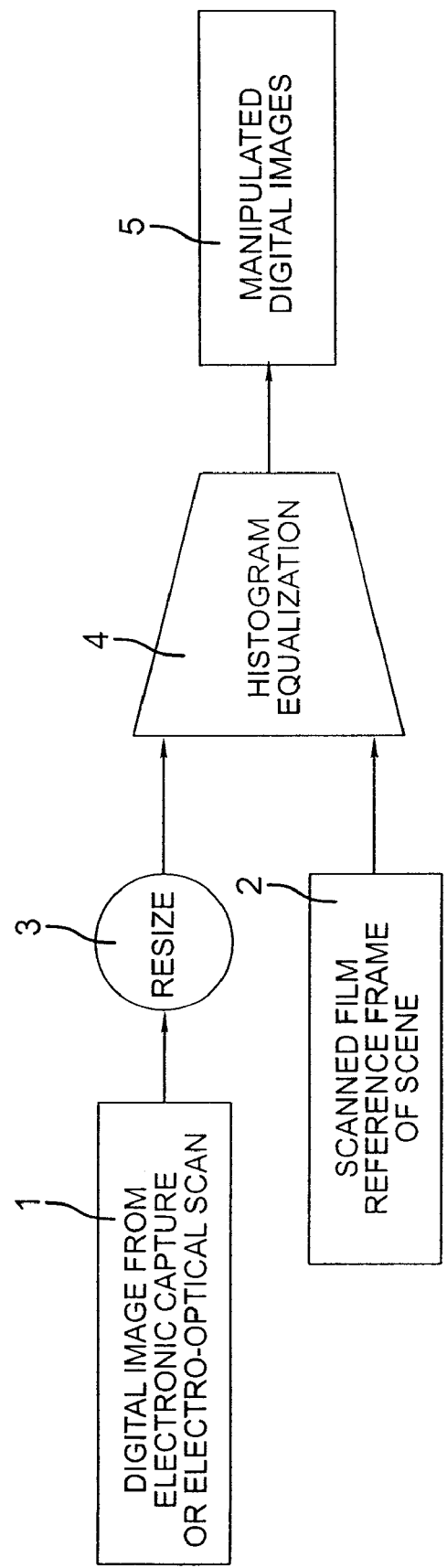
FIG. 1 is a schematic block diagram of a digital imaging process known in the prior art.

Because video or digital image processing systems that emulate the look of motion picture film, particularly after telecine conversion, are well known, the present description will be directed in particular to attributes forming part of, or cooperating more directly with, a system and a method in accordance with the present invention. Attributes not specifically shown or described herein may be selected from those known in the art. In the following description, a preferred embodiment of the present invention would ordinarily be implemented at least in part as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

The present invention employs algorithms developed from fundamental characterization of the imaging response of subject imaging devices such that reference image data is not required from simultaneous capture on multiple image media and from multiple imaging devices. Further, these fundamental relationships can easily be altered, again without need to re-capture reference scene image data, should emulation of multiple imaging scenarios be desired. These scenarios can include variations in scene color temperature, scene object reflectance spectra, and exposure level among others. Further, film imaging characteristics, as altered by non-standard chemical development techniques, can also be emulated by adjusting image processing algorithms rather than by re-establishing the statistical relationship between images simultaneously captured using two different imaging systems and/or media.

As detailed, the present invention provides a system and method for rendering scan-only film captured images to emulate the appearance in tonescale and color of images captured with photographic motion picture film, and subsequently printed onto another motion picture film and displayed theatrically (negative-positive system) or rendered to standard format video and displayed via television broadcast. The method of this invention can also apply to a reversal motion picture system; the aspects of the invention remain the same. There are two related aspects of the invention: the preliminary step of setting up the system to provide the required emulation and the subsequent operational use of the system, as thus set-up, to process the images captured by the scan-only film. The preliminary step of the present invention is to create the LUTs and matrices that determine the captured scan-only film exposure data, emulate the photographic film exposures, and generate photographic filmic images in tonescale and color. Once these LUTs and matrices are established for the particular scan-only film, they are utilized in the operational stages for all the scenes with the same set-up.

Figure 2:
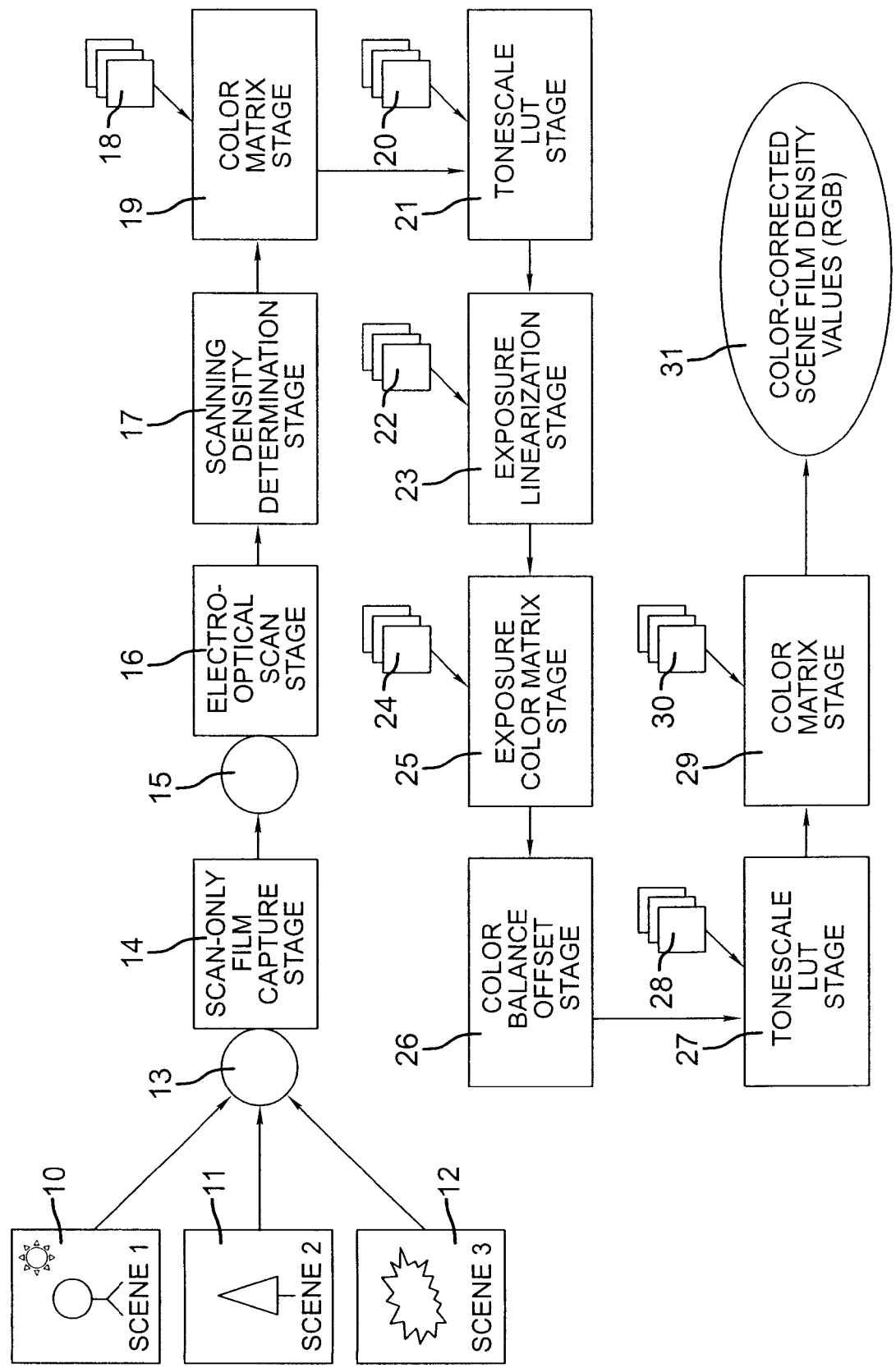
FIG. 2 is a schematic block diagram of a method and system for emulating the look of film origination according to the present invention.

FIG. 2 is a schematic block diagram of the present invention, as applied to the processing of images captured by scan-only film. It also shows one of the advantages of the present invention in that several different scenes may be processed using the same algorithms and without a photographic film reference.

More specifically, for the purpose of illustration, three typical scenes, such as a talent close-up scene 10, a background scene 11 and an action scene 12, are all shot in a capture stage 14 with the scan-only film 13, and then image processed using the same algorithms and without a photographic film reference.

The initial objective is to transform the scan-only film captured exposures so as to emulate photographic film scene exposures. First, the scan-only film must be transferred electro-optically to a video or data signal in a scan stage 16 on any typical motion picture film scanner or telecine 15. The electronic signal, related to the film's optical scanning density, is converted to optical scanning density values by suitable image processing. Different electro-optical scanning electronics may manipulate scanned film signals according to different objectives, and there are multiple standard practices for how any particular piece of equipment will deliver an electronic signal from the scanned film frames. As reference, "Interface of Motion-Picture Films and Video" presented by Powell, Sehlin, Zavada, and Bogdanowicz in the SMPTE JOURNAL (June 1986) describes some potential signal processing operations contained within typical electro-optical scanning electronics designed for video and television applications. In the present invention, suitable image processing must be chosen for the specific electro-optical scanner of choice to properly transform electronic signals resultant from the scanning operation into signals representative of the film's optical scanning density. This transformation 17 can be determined by examination of typical device processing schematics, again as exemplified by Powell, et al. Another suitable technique involves the creation of a three-dimensional LUT or other proper regression relating data gathered from the scanning of various film frames containing multiple color patches of known optical scanning densities to the final electronic signal resultant from the sum of signal processing operations within the electro-optical scanning electronics. Once calculated, the film optical scanning density can then be transformed to a signal representative of scene exposure by a 2-stage process. First, a predetermined LUT/matrix 18 for color characterization is needed in a color stage 19 to produce properly uncorrelated color optical density signals (independent of interlayer interimage effects) from the scanned film as described by Hunt in "Color Bars On Film For Setting Up Telecines" (SMPTE Journal, February 1978). Second, a predetermined non-linear 1D LUT 20 in each color record is needed for relating uncorrelated color optical density information to scene exposures in a tonescale stage 21. Exposures are further linearized in a stage 23 with a non-linear 1D LUT 22.

These scan-only film scene exposures may be modified again with a matrix operation 24 to increase their accuracy versus the photographic film scene exposures. This step can be optional inasmuch as the scan-only scene exposures may be sufficiently close to photographic film exposures, but practice has shown that doing this matrix operation leads to improved results. Such accuracy is increased if the scan-only film system possesses spectral product curves that can be reasonably approximated as a linear combination of conventional motion picture camera and film system spectral product curves. By satisfying this condition, the invention is capable of "seeing" a scene in the same way that photographic motion picture film does. After this matrix 24 is applied to the exposure signals in an exposure transform stage 25, the resulting signals will represent photographic film system exposure information more accurately. Another optional step in the process at this point is the application of a color-dependent offset factor 26 in the scene exposure signal such as to compensate for a neutral reproduction of principle scene illumination sources of varying color temperature.

Next, the exposure-corrected scan-only film scene exposures are processed through a scanner density stage 27, which executes a predetermined nonlinear mathematical function, by means of a 1D LUT 28, on the exposure-corrected scan-only film scene exposures. The purpose of the LUT 28 is to relate scene exposure to scanned photographic film density in a manner that is independent of interlayer image effects. More specifically, nonlinear image processing is applied to the exposure-corrected scan-only film scene exposures in order to emulate the photographic film tone scale densities. One skilled in the art of image processing should be familiar with such nonlinear methods. For this example, three one-dimensional LUTs (one per color record) were used in the scanner density stage 27; an alternative technique could employ a single three-dimensional LUT. At this point in the process shown in FIG. 2, the tonescale-corrected scan-only film captured exposures are rendered with the tonescale of the photographic film, and therefore will be referred to as tonescale-corrected scene film density values.

Figure 3:
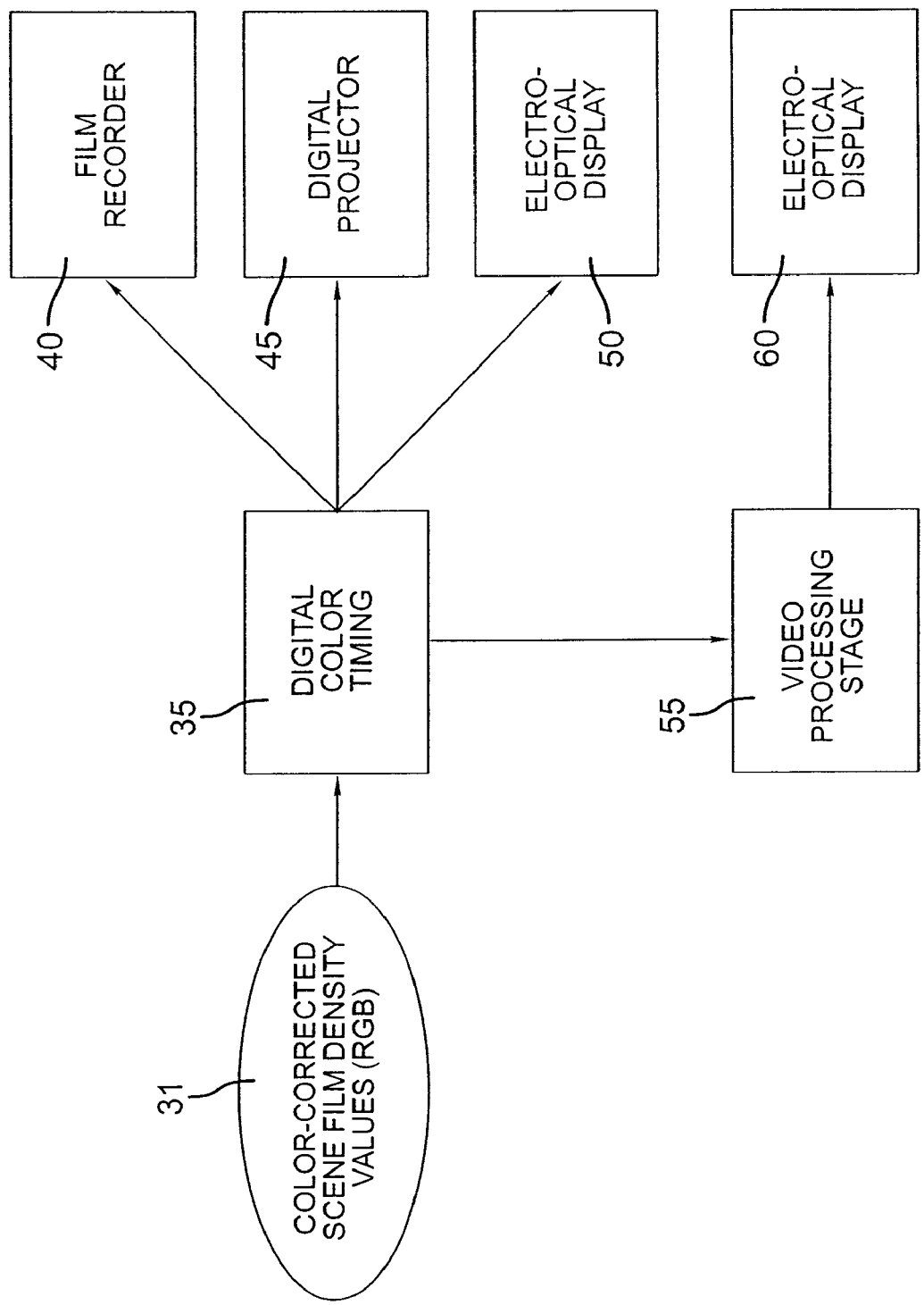
FIG. 3 is a schematic block diagram of a method and system for preparing the emulated film looks for exhibition or display.

The tonescale-corrected scene film density values, which may be thought of as calculated "scanned densities" of the scan-only film captured image that are independent of color cross talk, are mathematically transformed by one or more operations, embodied as another matrix 30, in a scanner density color matrix stage 29. This stage transforms the tonescale-corrected scene film density values to provide data having a photographic film color look. After this step, the present invention has achieved the emulation of photographic film tone and color from scan-only film originated images, and the result will be referred to as color-corrected scene film density values 31. Referring to FIG. 3, once the film color look is obtained, these color-corrected scene film density values may be sent to various outputs, such as a film recorder 40 or a digital projector 45. Other possible output venues include an electro-optical display 50, such as a television display, a liquid crystal display, a laser projector or like kinds of devices, retinal projection, or electro-optic mechanisms. There may be certain situations in which it would be desirable to transfer the processed film to video by means of a telecine apparatus.

In the preferred embodiment, however, a digital color balance stage 35 is first applied to the color-corrected scene film density values of the scan-only film captured images, which serves the purpose of digitally color-balancing the images by balancing a reference neutral to a previously determined scanner density. This scanner density is recorded on film as described in a tutorial article by G. Kennel, "Digital Film Scanning and Recording: The Technology and Practice", *SMPTE Journal*, March 1994, pp. 174-181, and the recorded output film is subsequently printed to LAD (Laboratory Aim Density). The printing procedure utilizing LAD is documented in an article by Pytlak and Fleischer entitled "A Simplified Motion-Picture Laboratory Control Method for Improved Color Duplication", *SMPTE Journal* Volume 85, October 1976. This scanner density will vary greatly with the user's artistic objectives. The output resulting from the color timing stage 35 will be referred to as balanced scene film density values.

These balanced scene film density values are now sent, for the purpose of this embodiment, to the film recorder device 40, where image data corresponding to the balanced scene film density values is written on film, e.g., by a known laser writing process. The film is then processed in a film processor stage in accordance with Eastman Kodak's H-24 Processing Manual. For the purpose of the preferred embodiment, the scan-only film originated images from the scenes 10, 11 and 12 now exist on one or more pieces of film; importantly, each film now emulates the appearance in tonescale and color of images captured with photographic motion picture origination film. The output film (that film which existed in the film recorder) is then printed onto another motion picture film, using the standard procedures as outlined in Eastman Kodak's H-1 Professional Motion Picture Films publication. The film onto which the output film was printed is subsequently processed, in accordance with Eastman Kodak's H-24 Processing Manual and displayed theatrically, just as if film had been used as the originating medium. Note that in utilizing the present invention, no film reference was needed during the operational process shown in FIG. 2 and all the algorithms for the three different scenes were the same, based on the scan-only film setup of the film scanner or telecine.

As an additional embodiment, the balanced scene film density values can also be sent to a digital projector 45 wherein suitable image processing is used to prepare the density values with proper color and tone characteristics so as to emulate the photographic motion picture film projection system. Similarly, the balanced scene film density values may be sent to another electro-optical display device 50, again with suitable image processing employed to prepare the density values with proper color and tone characteristics so as to emulate the photographic motion picture film projection system.

In an additional embodiment, rendered balanced scene film density values may be transformed by a series of matrices and LUTs 55 to represent the processes involved in electro-optical telecine scanners for producing standard format video signals from film images. Once transformed, these signals may be displayed on a suitable electro-optic display 60, such as a television display, a liquid crystal display, a laser projector or like kinds of devices, retinal projection, or electro-optic mechanisms.

Red, green and blue film exposure values (R, G, B) can be calculated for both the scan-only and photographic film in an exposure determination step using a conventional film exposure calculation method, such as the following method. Computations of exposure values, from any object, depend on four factors: the spectral reflectance of the object (Reflec($\lambda$)), the power distribution of the illuminant used (Illum($\lambda$)), the spectral sensitivity curves of the detector capturing the scene (Sensi($\lambda$)), and the set of optical elements used in the capture device (Optics($\lambda$)). For the present invention, Optics($\lambda$) is defined as the set all elements present between and including the film camera "taking" lens and Sensi($\lambda$) refers to the film's spectral sensitivity. Exposure values are calculated according to the following equations:

$$R = \int_{\lambda-visual} Sensi_{red}(\lambda) \cdot Illum(\lambda) \cdot Optics(\lambda) \cdot Reflec(\lambda) d\lambda$$

$$G = \int_{\lambda-visual} Sensi_{green}(\lambda) \cdot Illum(\lambda) \cdot Optics(\lambda) \cdot Reflec(\lambda) d\lambda$$

$$B = \int_{\lambda-visual} Sensi_{blue}(\lambda) \cdot Illum(\lambda) \cdot Optics(\lambda) \cdot Reflec(\lambda) d\lambda$$

Eqs. (1a, 1b, 1c)

The system spectral product (SSP($\lambda$)) of a capture system is defined as:

$$SSP(\lambda) = Sensi(\lambda) \cdot Illum(\lambda) \cdot Optics(\lambda) \quad \text{Eq. (2)}$$

Where Sensi(λ) represents Sensi$_{red}$(λ), Sensi$_{green}$(λ), or Sensi$_{blue}$(λ). Both the spectral power distribution of the light source and the spectral reflectance of the object can be readily measured with a spectral radiometer, a common commercially-available device. The spectral responsivities of photographic film are published in the manufacturer's data sheets.

In the exposure color matrix stage 25, the neutral-corrected scan-only film scene exposures are converted into exposure-corrected scan-only film scene exposures (i.e., corresponding to photographic film exposures) by application of a matrix 24 to the neutral-corrected scan-only film scene exposures. This matrix 24 is calculated from the known scan-only film exposures by regressing the calculated RGB scan-only film scene exposures against the calculated R, G, B photographic film exposures values. One skilled in the art of image processing should be familiar with the various regression techniques existing in packaged software, such as Mathematica or MATLAB. The technique is analogous to the matrixing techniques employed in U.S. Pat. No. 5,668,596, "Digital Imaging Device Optimized for Color Performance". This patent, which is incorporated herein by reference, demonstrates the use of a correction matrix on a video imaging system and discusses a method for minimization of the error between the set of spectral sensitivities of an imaging device, including its optical section, and the color sensitivities of the output device. This design allows a matrix (linear) operation, which is usually referred to as a color-correction matrix (CCM), to transform the "electronic camera exposure space" (which could also be thought of as scan-only film exposure space) into another space, which in the patent is the "display monitor exposure space" but could analogously be another space such as photographic film exposure space. The application of the matrix 24 provide exposure-corrected red, green and blue scan-only film captured exposures that emulate the desired photographic film stock's R, G, B exposures in tone and color. This exposure matrix needs to be created only once per scan-only film set-up. If more than one scene was shot with the same scan-only film set-up, the same exposure matrix applies to all of the scenes.

In certain cases, it may be desirable for purposes of exposure accuracy to design the system such that the scan-only film image capture system possesses spectral product curves that can be closely approximated as a linear combination of conventional motion picture camera and film system spectral product curves. Because of the linear approximation between the spectral product curves, the conversion step can be performed by a matrixing operation, which may be used for the matrix 18 in the present invention.

The exposure-corrected red, green and blue scan-only film captured exposures that have been processed to emulate photographic film exposures are the inputs to the scanner density stage 27 for the emulation of photographic film tone scale, which is accomplished with nonlinear image processing, for example, with 3 one-dimensional LUTs 28. For each color record, the exposure-corrected red, green and blue scan-only film captured exposures are mapped to the corresponding film channel-independent scanner densities. Because of the interlayer interimage effects, the color correction appropriate for this type of system is complex, albeit well understood by those of ordinary skill in these arts. In typical photographic systems, color correction is provided by interlayer interimage effects which adjust the formation of cyan, magenta, and yellow dyes. Due to the nature of the photographic system, these interlayer interimage effects produce adjustments that are non-linearly related to the exposures recorded in the latent image. This type of color correction, which we will refer to as subtractive-type correction, is discussed in detail in such texts as *The Theory of the Photographic Process*, MacMillan Publishing Co., 1977. Interlayer interimage effects are also discussed in commonly assigned U.S. Pat. No. 5,189,511, issued in the name of K. Parulski et al and entitled "Method and Apparatus for Improving the Color Rendition of Hardcopy Images from Electronic Cameras", which is incorporated herein by reference. Thus the LUTs 28 used in the scanner density stage 27 for film tone scale emulation are created. These scan-only film captured "scanner densities" have now been rendered with film tone scale, resulting in the aforementioned tone-scale corrected scene film density values.

Next the scan-only film captured "scanner densities", i.e., the tone-scale corrected scene film density values, are transformed by a color correction matrix stage 29 that brings a majority of these values closer to scanned film density. This color correction matrix is determined by fundamental characterization of the interimage interlayer effects found in photographic films. These scan-only film captured "corrected scanner densities" have now been rendered with the film color look, i.e., which emulate the photographic film R, G, B densities in tone and color. Now these corrected scanner densities, i.e., the aforementioned color-corrected scene film density values, of the scan-only film captured image may be sent to various outputs, such as the film recorder 40 or a digital projector 45 or prepared further as a standard video format for television broadcast via the matrices and 1D LUTs built into photographic post-telecine imaging processing 55 workflows for photographic films.

In an additional embodiment, any of the image processing operations described thus far could individually or as part of a series of sequential processing operations be converted into a three-dimensional lookup table as might be more suitable for including in a hardware of software processing scheme. In this manner, systems could be designed around the LUT processing as opposed to being required to implement each specific imaging math step explicitly.

The invention has been described with reference to a preferred embodiment. However, it will be appreciated that variations and modifications can be effected by a person of ordinary skill in the art without departing from the scope of the invention. For instance, noise (grain) reduction, regraining algorithms, such as those found in U.S. Pat. No. 5,641,596, as well as other image structure algorithms, such as blurring or sharpening techniques, could readily be performed on the electronic image files in conjunction with the present invention.

| PARTS LIST | |
|---|---|
| 1 | frame |
| 2 | scanned frame |
| 3 | resizing constraints |
| 4 | cumulative histogram equalization process |
| 5 | output manipulated images |
| 10 | talent close-up scene |
| 11 | background scene |
| 12 | action scene |
| 13 | scan-only film |
| 14 | scan-only capture stage |
| 15 | motion picture film scanner or telecine |
| 16 | electro-optical scan stage |
| 17 | scanning density determination stage |
| 18 | predetermined LUT/matrix |

-continued

PARTS LIST

| | |
|---|---|
| 19 | color matrix stage |
| 20 | non-linear one-dimensional LUT |
| 21 | tonescale LUT stage |
| 22 | non-linear one-dimensional LUT |
| 23 | exposure linearization stage |
| 24 | matrix operation |
| 25 | exposure color matrix stage |
| 26 | color balance offset stage |
| 27 | tonescale LUT stage |
| 28 | one-dimensional LUT |
| 29 | color matrix stage |
| 30 | matrix |
| 31 | color-corrected scene film density values (RGB) |
| 35 | digital color timing stage |
| 40 | film recorder device |
| 45 | digital projector |
| 50 | electro-optical display device |
| 55 | video processing stage |
| 60 | electro-optic display |

What is claimed is:

1. A method for converting a sequence of scan-only film captured images into a sequence of modified images providing the appearance of images captured by a photographic film reproduction system; the photographic film reproduction system being of the type that includes photographic motion picture negative film printed onto a motion picture print film that is displayed, or a reversal motion picture system in which the reversal film is displayed, or a photographic motion picture film electro-optically scanned to standard format video by a telecine and further displayed, or a photographic motion picture film electro-optically scanned by a scanner suitable for producing digital data intended for additional digital image manipulation and further preparation as a digital master for electronic distribution such as digital theatrical projection or various types of broadcast video; or recorded out to another photographic film to be used as a printing master for producing distribution optical prints for theatrical projection, said method comprising the steps of:
   a) photographically capturing a sequence of images on a scan-only film;
   b) chemically processing the scan-only film to produce photographic film images;
   c) electro-optically scanning the processed photographic film images to produce electronic images in either video or data formats;
   d) transforming scan-only film captured image video or data into signals representative of the scan-only film's optical scanning densities;
   e) transforming the scan-only film's optical densities with a linear function that represents the film's interimage interlayer effects to produce uncorrelated color optical density data;
   f) transforming the scan-only film's uncorrelated color optical densities with a non-linear function that emulates the film's uncorrelated characteristic density response to scene exposure to produce linearized exposure data and neutral-corrected scan-only film captured images;
   g) transforming the neutral-corrected scan-only film captured images with a linear function that emulates a film exposure of the film reproduction system to produce exposure-corrected scan-only film captured images;
   h) transforming the exposure-corrected scan-only film captured images with a non-linear function that renders the exposure-corrected scan-only film captured images with a tone scale of the film reproduction system to produce tonescale-corrected scan-only film captured images; and
   i) transforming the tonescale-corrected scan-only film captured images with a linear function that emulates a film color look provided by the film reproduction system to produce modified images that provide the appearance of an image that had been captured with the film reproduction system, and wherein the above transforming steps are referenced to scanned film densities of a photographic film used in the photographic film reproduction system.

2. The method as claimed in claim 1 wherein the steps of photographically capturing a sequence of images with a scan-only film and electro-optically scanning the chemically processed scan-only film images to produce scan-only film captured image data or video, and b) transforming the scan-only film captured image data or video into linearized exposure data includes providing the linearized exposure data from the scan-only film used to capture a sequence of motion images.

3. The method as claimed in claim 1 wherein a three-dimensional lookup table represents a transform function described in a combination of consecutive steps or any single step.

4. The method as claimed in claim 1 further comprising the step of recording the modified images on film.

5. The method as claimed in claim 1 further comprising the step of displaying the modified images with a display.

6. The method as claimed in claim 5 in which the display is either
   (a) an electro-optical display including at least one of a digital projector, a television display, a video projector, a liquid crystal display or a laser projector; or
   (b) retinal projection or (c) an electro-optic mechanism.

7. The method as claimed in claim 1 in which the modified images are further transformed to standard format video signals suitable for television.

8. The method as claimed in claim 7 wherein a three-dimensional lookup table represents a transform function described in a combination of consecutive steps or any single step.

9. The method as in claim 7 in which the display is either (a) an electro-optical display including at least one of a digital projector, a television display, a video projector, a liquid crystal display or a laser projector; or (b) retinal projection or (c) an electro-optic mechanism.

10. The method as claimed in claim 1 wherein the modified images are color-balanced before subsequent utilization by balancing a reference neutral to a predetermined scanner density value.

11. The method as claimed in claim 10 wherein a three-dimensional lookup table represents a transform function described in a combination of consecutive steps or any single step.

12. The method as claimed in claim 10 further comprising the step of recording the modified images on film.

13. The method as claimed in claim 10 further comprising the step of displaying the modified images on a display.

14. The method as claimed in claim 13 in which the display is either (a) an electro-optical display including at least one of a digital projector, a television display, a video projector, a liquid crystal display or a laser projector; or (b) retinal projection or (c) an electro-optic mechanism.

15. The method as claimed in claim 10 in which the modified images are further transformed to standard format video signals suitable for television.

16. The method as claimed in claim 15 wherein a three-dimensional lookup table represents a transform function described in a combination of consecutive steps or any single step.

17. The method as in claim 15 in which the display is either (a) an electro-optical display including at least one of a digital projector, a television display, a video projector, a liquid crystal display or a laser projector; or (b) retinal projection or (c) an electro-optic mechanism.

18. The method as claimed in claim 1 wherein the step of transforming scan-only film captured image video or data into signals representative of the film's optical scanning densities is performed with image processing that reverses signal processing of any electro-optical scanning device.

19. The method as claimed in claim 1 wherein the step of transforming the scan-only film optical densities with a linear function that represents the film's interimage interlayer effects to produce uncorrelated color optical density data is performed with a color matrix generated by characterizing the interlayer interimage effects of the scan-only film.

20. The method as claimed in claim 1 wherein the step of transforming the scan-only film uncorrelated color optical densities with a non-linear function is performed with a look up table that is determined by mapping the exposure-corrected scan-only film exposures to channel-independent printing densities corresponding to the scanned film densities of the scan-only film to obtain neutral-corrected scan-only film captured images.

21. The method as claimed in claim 1 wherein the step of transforming the neutral-corrected scan-only film captured images with a linear function that emulates a film exposure of the photographic film reproduction system is performed with a matrix that is determined by regressing the neutrally-corrected scan-only film exposures against the photographic film exposures to obtain exposure-corrected scan-only film exposures.

22. The method as claimed in claim 12 wherein the step of transforming the exposure-corrected scan-only film captured images with a non-linear function that renders the exposure-corrected scan-only film captured images with a tone scale of the photographic film reproduction system is performed by a look up table that is determined by mapping the exposure-corrected scan-only film exposures to channel-independent printing densities corresponding to the scanned film densities to obtain tonescale-corrected scene film density values.

23. The method as claimed in claim 13 wherein the step of transforming the tonescale-corrected scene film density values with a linear function that emulates a photographic film color look provided by the photographic film reproduction system is performed with a matrix that is determined by characterizing the interimage interlayer effects of a photographic film.

24. A method for converting a sequence of scan-only film captured images into a sequence of modified images providing the appearance of images captured by a photographic film reproduction system; the photographic film reproduction system being of the type that includes photographic motion picture negative film printed onto a motion picture print film that is displayed, or a reversal motion picture system in which the reversal film is displayed, or a photographic motion picture film electro-optically scanned to standard format video by a telecine and further displayed, or a photographic motion picture film electro-optically scanned by a scanner suitable for producing digital data intended for additional digital image manipulation and further preparation as a digital master for electronic distribution such as digital theatrical projection or various types of broadcast video; or recorded out to another photographic film to be used as a printing master for producing distribution optical prints for theatrical projection, said method comprising the steps of:

a) photographically capturing a sequence of images on a scan-only film;

b) chemically processing the scan-only film to produce photographic film images;

c) electro-optically scanning the processed photographic film images to produce electronic images in either video or data formats;

d) transforming scan-only film captured image video or data into signals representative of the scan-only film's optical scanning densities;

e) transforming the scan-only film's optical densities with a linear function that represents the film's interimage interlayer effects to produce uncorrelated color optical density data;

f) transforming the scan-only film's uncorrelated color optical densities with a non-linear function that emulates the film's uncorrelated characteristic density response to scene exposure to produce linearized exposure data and neutral-corrected scan-only film captured images;

g) transforming the neutral-corrected scan-only film captured images with a non-linear function that renders the exposure-corrected scan-only film captured images with a tone scale of the film reproduction system to produce tonescale-corrected scan-only film captured images; and h) transforming the tonescale-corrected scan-only film captured images with a linear function that emulates a film color look provided by the film reproduction system to produce modified images that provide the appearance of an image that had been captured with the film reproduction system, and wherein the above transforming steps are referenced to scanned film densities of a photographic film used in the photographic film reproduction system.

25. The method as claimed in claim 24 further comprising the step of providing linearized exposure data from a scan-only film used to capture the sequence of motion images for steps a), c), and d) above.

26. The method as claimed in claim 24 wherein a three-dimensional lookup table represents a transform function described in a combination of consecutive steps or any single step.

27. The method as claimed in claim 24 further comprising the step of recording the modified images on film.

28. The method as claimed in claim 24 further comprising the step of displaying the modified images with a display.

29. The method as claimed in claim 28 in which the display is either (a) an electro-optical display including at least one of a digital projector, a television display, a video projector, a liquid crystal display or a laser projector; or (b) retinal projection or (c) an electro-optic mechanism.

30. The method as claimed in claim 24 in which the modified images are further transformed to standard format video signals suitable for television.

31. The method as claimed in claim 30 wherein a three-dimensional lookup table represents a transform function described in a combination of consecutive steps or any single step.

32. The method as in claim 30 in which the display is either (a) an electro-optical display including at least one of a digital projector, a television display, a video projector, a liquid crystal display or a laser projector; or (b) retinal projection or (c) an electro-optic mechanism.

33. The method as claimed in claim 24 wherein the modified images are color-balanced before subsequent utilization by balancing a reference neutral to a predetermined scanner density value to obtain modified images.

34. The method as claimed in claim 33 wherein a three-dimensional lookup table represents a transform function described in a combination of consecutive steps or any single step.

35. The method as claimed in claim 33 further comprising the step of recording the modified images on film.

36. The method as claimed in claim 33 further comprising the step of displaying the modified images on a display.

37. The method as claimed in claim 36 in which the display is either (a) an electro-optical display including at least one of a digital projector, a television display, a video projector, a liquid crystal display or a laser projector; or (b) retinal projection or (c) an electro-optic mechanism.

38. The method as claimed in claim 33 in which the modified images are further transformed to standard format video signals suitable for television.

39. The method as claimed in claim 38 wherein a three-dimensional lookup table represents a transform function described in a combination of consecutive steps or any single step.

40. The method as in claim 38 in which the display is either (a) an electro-optical display including at least one of a digital projector, a television display, a video projector, a liquid crystal display or a laser projector; or (b) retinal projection or (c) an electro-optic mechanism.

41. A system for converting a sequence of scan-only film captured images into a sequence of modified images providing the appearance of images captured by a photographic film reproduction system; the photographic film reproduction system being of the type that includes photographic motion picture negative film printed onto a motion picture print film that is displayed, or a reversal motion picture system in which the reversal film is displayed, or a photographic motion picture film electro-optically scanned to standard format video by a telecine and further displayed, or a photographic motion picture film electro-optically scanned by a scanner suitable for producing digital data intended for additional digital image manipulation and further preparation as a digital master for electronic distribution such as digital theatrical projection or various types of broadcast video; or recorded out to another photographic film to be used as a printing master for producing distribution optical prints for theatrical projection, said system comprising:

a) a scan-only film for capturing a sequence of images;
b) a chemical processor for processing the film;
c) an electro-optical scanner for scanning the processed film images and obtaining electronic images in either video or data formats;
d) a processor for converting the scan-only film captured image video or data into signals representative of the film's optical scanning densities;
e) a first linear processor for transforming the scan-only film optical densities with a linear function that represents the film's interimage interlayer effects to produce uncorrelated color optical density data;
f) a first non-linear processor for transforming the scan-only film uncorrelated color optical densities with a non-linear function that emulates the film's uncorrelated characteristic density response to scene exposure to produce linearized exposure data that yields neutral-corrected scan-only film captured images;
g) a second linear processor for transforming the neutral-corrected scan-only film captured images with a linear function that emulates a film exposure of the film reproduction system to produce exposure-corrected scan-only film captured images;
h) a second non-linear processor for transforming the exposure-corrected scan-only film captured images with a non-linear function that renders the exposure-corrected scan-only film captured images with a tone scale of the photographic film reproduction system to produce tonescale-corrected scene film density values; and
i) a third linear processor for transforming the tonescale-corrected scene film density values with a linear function that emulates a film color look provided by the photographic film reproduction system, resulting in modified images that provide the appearance of an image captured with the photographic film reproduction system, wherein the transformation steps are referenced to scanned film densities of a film used in the photographic film reproduction system.

42. The system as claimed in claim 41 wherein the first and second non-linear processors employ look up tables and the first, second, and third linear processors employ matrices.

43. The system as claimed in claim 41 wherein a three-dimensional lookup table represents a transform function described in a combination of consecutive steps or any single step.

44. The system as claimed in claim 41 further comprising a film recorder for recording the modified images on film.

45. The system as claimed in claim 41 further comprising a display for displaying the modified images.

46. The system as claimed in claim 45 in which the display comprises either (a) an electro-optical display including at least one of a digital projector, a television display, a video projector, a liquid crystal display or a laser projector; or (b) retinal projection or (c) an electro-optic mechanism.

47. The system as claimed in claim 41 in which the modified images are further transformed to standard format video signals suitable for television.

48. The method as claimed in claim 47 wherein a three-dimensional lookup table represents a transform function described in a combination of consecutive steps or any single step.

49. The system as in claim 47 in which the display comprises either (a) an electro-optical display including at least one of a digital projector, a television display, a video projector, a liquid crystal display or a laser projector; or (b) retinal projection or (c) an electro-optic mechanism.

50. The system as claimed in claim 41 further comprising a color timer stage for color-balancing the modified images before their subsequent utilization by balancing a reference neutral to a predetermined scanner density value to produce modified images.

51. The method as claimed in claim 50 wherein a three-dimensional lookup table represents a transform function described in a combination of consecutive steps or any single step.

52. The system as claimed in claim 50 further comprising a recorder for recording the modified images on film.

53. The system as claimed in claim 50 further comprising a display for displaying the modified images.

54. The system as in claim 53 in which the display comprises either (a) an electro-optical display including at least one of a digital projector, a television display, a video projector, a liquid crystal display or a laser projector; or (b) retinal projection or (c) an electro-optic mechanism.

55. The system as claimed in claim 50 in which the modified images are further transformed to standard format video signals suitable for television.

56. The method as claimed in claim 55 wherein a three-dimensional lookup table represents a transform function described in a combination of consecutive steps or any single step.

57. The system as in claim 55 in which the display comprises either (a) an electro-optical display including at least one of a digital projector, a television display, a video projector, a liquid crystal display or a laser projector; or (b) retinal projection or (c) an electro-optic mechanism.

* * * * *